United States Patent [19]

Patterson et al.

[11] Patent Number: 4,805,343

[45] Date of Patent: Feb. 21, 1989

[54] OSMOTIC FIBER SYSTEMS

[75] Inventors: James A. Patterson, Sarasota, Fla.; Robert M. Piecuch, Warsaw, Ind.; Charles E. Hamilton, Englewood, Fla.

[73] Assignee: Southeastern Illinois College Foundation, Ill.

[21] Appl. No.: 920,440

[22] Filed: Oct. 20, 1986

[51] Int. Cl.$^4$ .................................. A01G 27/00
[52] U.S. Cl. .............................. 47/79; 47/48.5; 47/81
[58] Field of Search ............... 47/79, 81, 48.5; 210/500.23, 500.3

[56] References Cited

U.S. PATENT DOCUMENTS

| | | | |
|---|---|---|---|
| 262,379 | 8/1882 | Dean | 47/81 |
| 470,437 | 3/1892 | McElhiney | 47/81 |
| 1,264,096 | 4/1918 | Lelievre | 47/81 |
| 2,072,185 | 3/1937 | Schein | 47/81 |
| 2,081,337 | 5/1937 | Lockyer | 47/81 |
| 3,069,807 | 12/1962 | Wall | 47/81 |
| 3,303,609 | 2/1967 | MacHenry | 47/9 |
| 4,016,677 | 4/1977 | Julinot | 47/80 X |
| 4,035,459 | 7/1977 | Kesting | 210/500.23 |
| 4,087,938 | 5/1978 | Koch | 47/48.5 |
| 4,182,357 | 1/1980 | Ornstein | 47/48.5 X |
| 4,224,048 | 9/1980 | Pendergast | 47/48.5 X |
| 4,235,561 | 11/1980 | Peterson | 47/48.5 X |
| 4,403,446 | 9/1983 | Wolfe et al. | 47/62 X |
| 4,447,983 | 5/1984 | Shinada | 47/48.5 |
| 4,527,354 | 7/1985 | Sellier | 47/81 |
| 4,667,439 | 5/1987 | Maillefer | 47/81 |

FOREIGN PATENT DOCUMENTS

| | | | |
|---|---|---|---|
| 1544194 | 9/1967 | France | 47/81 |
| 696175 | 10/1965 | Italy | 47/81 |
| 2133264 | 7/1984 | United Kingdom | 47/81 |

Primary Examiner—Robert A. Hafer
Assistant Examiner—Kevin G. Rooney
Attorney, Agent, or Firm—Charles J. Prescott; Raymond H. Quist

[57] ABSTRACT

A hollow fiber formed of hydrophilic material and having permeable walls is treated to enhance the permeability. Reactions used to treat the fiber have a gas inside and gas outside, a gas inside and liquid outside, a liquid inside and gas outside, and a liquid inside and a liquid outside. The treatments generally involve the plasticizing of the fiber material while having the inside of the fiber at a higher pressure than the outside. These treatments produce a structural change in the fiber from a flexible tube having strong walls to expanded, rigid and somewhat fragile walls. Where more than a short length of the treated fiber is to be used, an open mesh cage is used to confine the fiber to a desired volume during treatment and to protect it subsequently. A technique for joining flexible tubing to the treated fiber is presented. The treated fiber may be used in apparatus and methods involving osmosis and reverse osmosis. Novel plant irrigation methods and apparatus are disclosed, and structures for changing the solvent quanties of solutes and measuring the osmotic pressures of solutions are also presented.

12 Claims, 3 Drawing Sheets

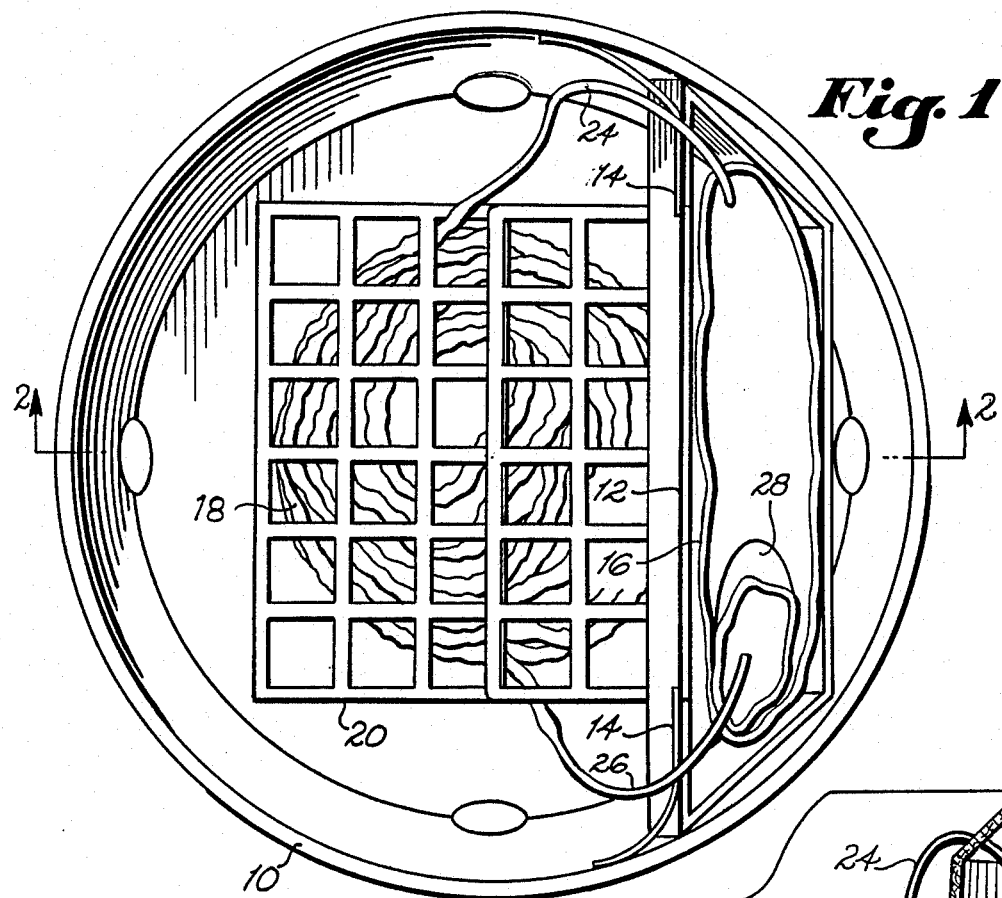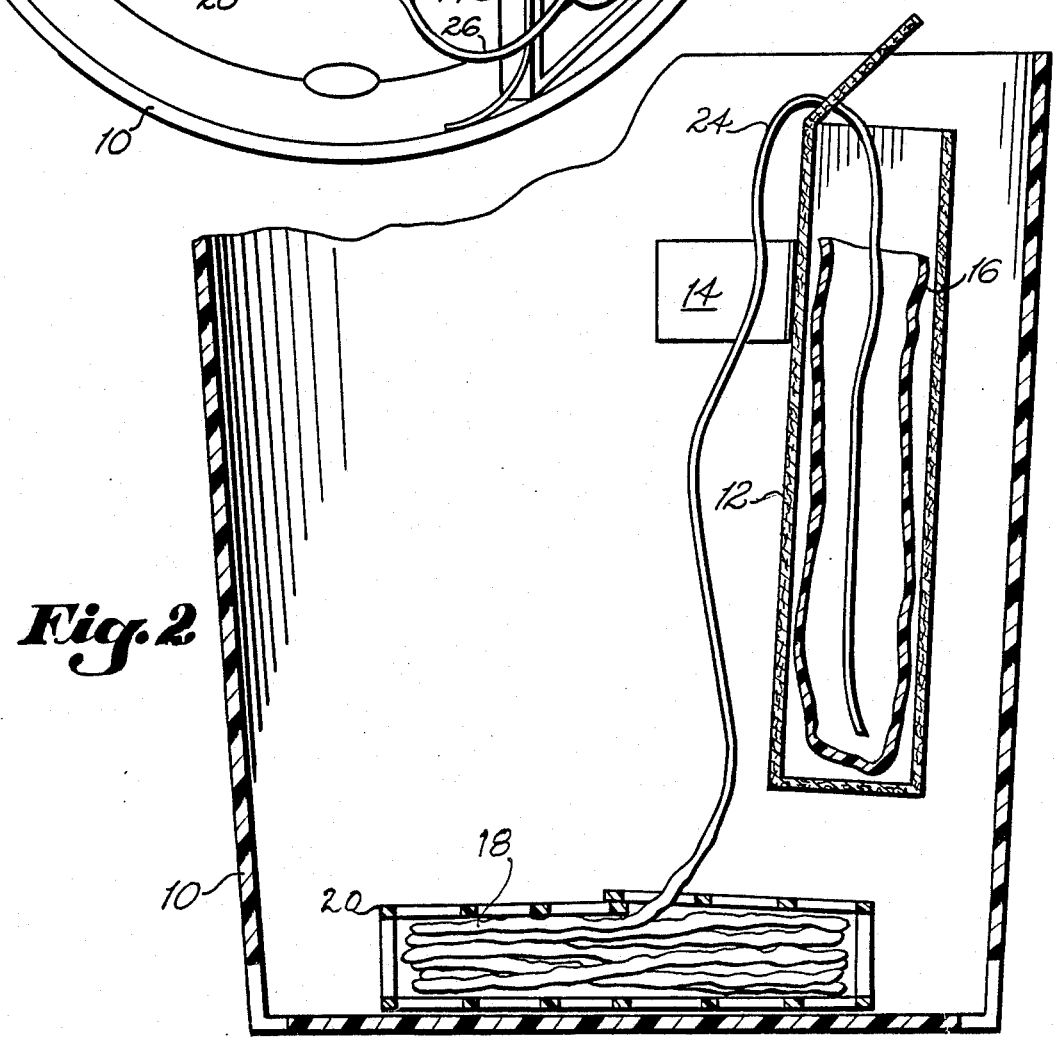

OSMOTIC FIBER SYSTEMS

BACKGROUND OF THE INVENTION

1. Field of the Invention

This invention relates generally to water permeable fiber systems and the preparation of the fibers, and more particularly to a system employing such fibers for plant irrigation where the fibers serve as an osmotic valve to dispense water upon demand by the plants.

2. Description of Related Art

An important aspect of the cultivation of plants is providing the proper amount of water. Not only do different types of plants require different amounts of water, but the humidity of the environment has an effect on the quantity of water which must be supplied. As a result, a substantial amount of time is expended to determine whether additional water is needed by a plant as well as actually providing it. Shopping malls, botanical gardens, plant nurseries and other places having a large number of plants therefore require employees solely for the care of the plants. Even where employees are provided solely to care for plants, the possibility of over or under watering of plants remains.

U.S. Pat. No. 4,527,354, Sellier, entitled: "Implantable Reservoir for automatic Watering of Plants", discloses a reservoir which is placed in the bottom of a pot and has wicks extending from the reservoir into the soil in which the plant is growing. A tube with a float gauge is included so that the water may be replenished.

The preparation of hollow cellulose acetate fibers by either hot melt extrusion or a melt spin process, results in a fiber wall having an asymmetric permeability. These hollow fibers have been used in a reverse osmosis system which applies a pressure higher than osmotic pressure to a mixture such as saline water, to cause pure water from the mixture to pass through the fiber wall into the tube. McClain et al. in U.S. Pat. No. 3,423,491 describe the preparation of such fibers.

U.S. Pat. No. 3,873,653, Meinecke et al, entitled: "Preparation of High Flux Cellulose Acetate Membranes and Hollow Fibers from Prefabricated Low Flux Specimens", discloses a process for improving the fibers disclosed by McLain so as to increase the rate at which pure water can be produced by desalinization using the fibers in reverse osmosis. It is noted that the amount of water extracted by these fibers decreases with the passage of time, requiring further treatment every 180 hours or so to maintain its improved efficiency.

The need for treatment or osmotic regeneration results from particles clogging the pores, and is a problem with prior art systems.

BRIEF DESCRIPTION OF THE DRAWINGS

FIG. 1 is a top view of a pot with the apparatus of this invention positioned therein;

FIG. 2 is an elevation in cross-section taken on the line 2—2 of FIG. 1;

SUMMARY OF THE INVENTION

Figure 3A:
FIG. 3A is a cross-section showing a first step in preparing a sealed joint on a hollow fiber.

Hydrophilic hollow fibers such as those formed of cellulose acetate have walls which are only slightly permeable to water. Such fibers are treated to enhance this permeability. This treatment increases the diameter of the fibers, results in a reduced wall thickness and changes the fiber from a strong flexible structure to a more fragile and inflexible form. These changes make it desirable to enclose the fiber in a cage during treatment to provide the treated fiber in a form which is more readily used.

The fiber wall is a membrane having a permeability which causes it to permit the passage of water while preventing dissolved and suspended solids from passing through. This passage of water occurs due to osmosis or reverse osmosis depending upon the activity of the water on both sides of the membrane. This osmotic valve characteristic is employed as a means of providing the proper amount of irrigation to plants which may be potted. For this purpose, one or more lengths of fiber are disposed in the soil in the vicinity of the roots of the plant. Water contained in the fiber will be dispensed into the soil at a rate which will be increased when the plant exudes a bio-surfactant associated with the need for more water. On the other hand, where the soil contains an excess of water, water may pass through the fiber wall into the fiber where it may be stored. Where an open end of the fiber is also disposed in the soil, water may be drawn into the fiber by capillary action.

This same osmotic valve action is used to add water, remove water and maintain a desired water content with respect to a solute. The fiber may also be used to measure osmotic pressure.

DETAILED DESCRIPTION OF INVENTION

Referring to FIGS. 1 and 2, pot 10 is shown which is the commonly used plastic pot in which plant nurseries provide plants for sale. Plastic pot 10 may be placed in an outer decorative container if desired. As depicted in FIGS. 1 and 2, pot 10 is prepared to receive a plant. Cardboard packet 12 is secured to the side of pot 10 by tape 14. Packet 12 has supported within it reservoir 16. Reservoir 16, in this embodiment, is a plastic bag having an opening in the top so that it may be filled with water.

Disposed in the bottom of pot 10, is coiled dispensing tube 18 in cage 20. Hollow fiber or tube 18 is provided with cage 20 which prevents crushing or damage to tube 18 by the soil and plant in pot 10. Cage 20 also serves to confine tube 18 to a desired volume during the processing of dispensing tube 18 as will be described later. Tube 18 has a first end portion 24 which extends from cage 20 and leads up and into the reservoir 16. The open end of this first end portion 24 is disposed adjacent to the bottom of the reservoir 16. First end portion 24 functions as a conveying tube to convey water from reservoir 16 to dispensing tube 18. Tube 18 has a second end portion 26 which extends from cage 20 and leads up to funnel device 28 which is shown lying in packet 12. Preferably, first end portion 24 and second end portion 26 of dispensing tube 18 may be omitted from the processing referred to previously and so have wall structures which do not require protective covers. Preferably, end portions 24 and 26 are separate elements secured to dispensing tube 18, but it is necessary to avoid joints which might leak.

Reservoir 16 and funnel device 28, in the preferred embodiment, are thin plastic bags. This permits not only these bags, but also tube 18 and its containment and end portions 24 and 26 to be packed in packet 12 after manufacture, for shipping and storage until it is to be used.

Once the apparatus is disposed in pot 10, water is introduced into reservoir 16 while funnel device 28 is held low enough to assure that dispensing tube is completely filled. When water flows from second tube end portion 26, all air has been driven out. At this time funnel device 28 is placed in the top of packet 12 and the plant and soil are placed in pot 10 in the usual manner. Although a plant has been placed in pot 10 and reservoir 16 is filled with water, dispensing tube 18 will dispense only a limited amount of water. Dispensing of water from reservoir 16 will occur slowly until root growth sufficient to reach tube 18 occurs. In this interim the plant is watered in the conventional manner. It should be recognized that in most cases this occurs while the plant is still in the nursery. When the plant has rooted sufficiently conventional watering is reduced to very long intervals. This change-over, which takes about one month, is evidenced by the onset and gradual increase of water consumption from reservoir 16. When the rate of water consumption from the reservoir levels off, surface watering of the plant can be safely limited.

It has been found that periods of active plant growth are accompanied by generation of bio-surfactants which are released by the plant roots. (L.A. Errede, Annals of Botany 52. 373–380, 1983) These surfactants produce a hydrophilic soil-membrane interface which, in the case of dispensing tube 18 will cause an increase of water molecules to pass through the pores in the tube wall from the inside to the outside. Consequently, water is dispensed by the system of this. Invention mainly in response to plant needs. Excess watering which would at least be wasteful, if not harmful, is improbable using the hollow fiber of this invention. Moreover, when the plant roots become entwined with coiled dispensing tube 18, the remaining soil in the pot will become relatively dry. As a result, little moisture passes into the air in spite of the low humidity which may be maintained in the situs of the plant.

In the arrangement shown in FIGS. 1 and 2 conveying tube 24 acts as a siphon which removes water from the bottom of reservoir 16 which is located in pot 10. Conveying tube 24 may also deliver water to dispensing tube 18 from a reservoir located outside pot 10. Such an external reservoir can be located above dispensing tube 18 for delivering water as a siphon or by simple gravity feed, and may even be located below dispensing tube 18 if the reservoir is pressurized.

We have found that the stiff, inflexible nature of the cellulose acetate hollow fibers used as dispensing tube 18 require a flexible tubing be used at both ends for conveying tube or first end portion 24 and second end portion 26. These flexible ends allow durable connections to reservoir systems for a dispensing coil in a plant pot. It has also been found, however, that conventional connectors which are positioned in the soil will fail because root fibers penetrate the joint and force the sealed connection from the hollow fiber; causing the system to leak and fail.

Figure 3B:
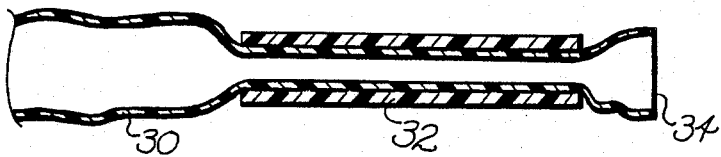
FIG. 3B is a cross-section showing the joint of FIG. 3A after processing of the hollow fiber.
Figure 3C:
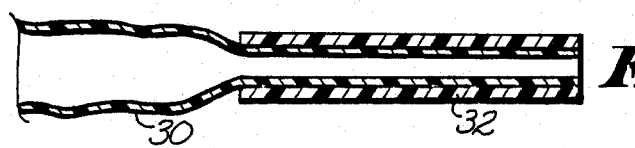
FIG. 3C is a cross-section showing the joint of FIG. 3B when it has been trimmed.

Referring to FIGS. 3A–3C, a cellulose acetate hollow fiber 30 is shown in FIG. 3A having a flexible sleeve 32 positioned near the end 34 of fiber 30. Sleeve 32 need not fit snugly over hollow fiber 30. The outside diameter of fiber 30 can be from 10–50 per cent less than the inside diameter of sleeve 32. Small spacing should be allowed between the two. During the processing of hollow fiber 30 (which is described layer) hollow fiber 30 expands to a larger diameter with a thinner wall, while sleeve 32 retains its original dimensions. This is illustrated in FIG. 3B. In this expansion of hollow fiber 30, it expands within sleeve 32 to the extent sleeve 32 permits. This forms such an intimate connection along the length of sleeve 32 that roots do not penetrate in the interface between fiber 30 and sleeve 32. As shown in FIG. 3C, the excess portion of hollow fiber 30 which includes end 34 may be trimmed off to provide a clean end. A conventional connector external to the pot can then be used to join other tubing to sleeve 32.

It should be noted that the membrane surface area available in the case of the Errede experiment is limited to the cross-sectional area of the reservoir across which the membrane is stretched. In the case of dispensing tube 18, the area available is the surface of the tube wall which can be increased by making the dispensing tube longer.

Because a membrane stretched across the bottom of a vertically extending cylindrical container must be strong enough to support the weight of the water above, this membrane must be made thick enough for this requirement. Tube 18, however, may be made thin walled because of the negligible pressure of the water therein. The flow of water through the membrane is a function of thickness, so that tube 18 will, with the application of the bio-surfactant, have a higher flow rate "Q" of water than would a corresponding area of a thicker membrane.

As previously mentioned, tube 18 will dispense water very slowly until triggered by a bio-surfactant released by the plant. When a surfactant is not present, tube 18 and first end portion 24 (the conveying tube) and second end portion 26 are a continuous closed walled tube and water is only slowly dispensed.

THE OSMOTIC VALVE

The discussion of hollow fiber dispensing tube 18 given above was concerned with providing water from a reservoir to the roots of a plant through the fiber wall. It should not be overlooked, however, that this fiber wall is a permeable membrane which will also permit water to pass into this hollow fiber from the outside. In general, water on each side of the membrane—or in this case inside and outside the hollow fiber—will be at a hydraulic pressure which is the resultant of such factors as the hydrostatic pressure head, solids dissolved or suspended in the water, and the temperature of the water or water mixture. When the hydraulic pressure on one side of the fiber wall exceeds that on the other side by at least the osmotic pressure, water will pass through the wall to the side of the lower hydraulic pressure. Thus the fiber wall acts much as a pressure relief valve which will permit water flow when the pressure rises sufficiently.

In the description of FIGS. 1 and 2, water passed from inside the fiber to outside where the plant roots absorbed it. This root absorption will normally keep the hydraulic pressure outside the fiber lower than that inside the fiber. If, however, the pot receives a direct application of water, such as by rain, the hydraulic pressure outside the fiber may exceed that inside, and water will pass into the fiber. Consequently, the fiber acts as a reservoir for excess water from the pot. This water will subsequently pass back outside the fiber when the outside hydrostatic head lowers. It should be noted that this movement into the fiber will occur provided the fiber is not closed at the ends so that a pressure build-up inside fiber does not occur.

PREPARATION OF THE HOLLOW FIBER

Fibers in accordance with this invention have been produced which are asymmetric with respect to osmotic mechanisms, but are opposite from previous fibers because the flow of pure water is from the inside of the fiber to the outside. Moreover, with flow outward through the tube walls instead of inward, the pores of the tube are self cleaning, and -in fact- show an increase in flow with the passage of time.

As will be described in detail below, the processes involve treatment of cellulose acetate fibers of the type described in the McLain et al. patent referred to above. These treatments involve exposing the inside and outside of the fibers to different phases. Four different reaction phase categories will be disclosed.

REACTION I—LIQUID INTERNAL PHASE AND GAS EXTERNAL PHASE

In Reaction I, aqueous solutions of formamide were introduced into the interior of a fiber while the exterior was left in the ambient air. The solutions, in terms of the percentage of formamide, and the resulting flow rates through the fiber wall from the inside to the outside were as follows:

| 85% Aqueous Formamide | 0.807 ml/ft/da |
| 75% Aqueous Formamide | 0.915 ml/ft/da |
| 65% Aqueous Formamide | 0.975 ml/ft/da |

The flow rates given are in terms of a linear foot of fiber. The flow rates achieved are an improvement over the flow rate reported in U.S. Pat. No. 3,873,653 of Q=0.009 gal/ft$^2$ day. The fibers prepared in Reaction I had sticky exterior surfaces which may be useful for some purposes and detrimental for other purposes. Reaction II resulted in fibers which did not have this sticky exterior surface.

REACTION II—LIQUID INTERNAL PHASE AND LIQUID EXTERNAL PHASE

In Reaction II, the interior of the fibers had the same aqueous formamide solutions as in Reaction I, but these interior solutions were pressurized with nitrogen at a pressure of 10 psig. The fibers were disposed in water at ambient temperature. (Without this external water, the fibers were sticky as in Reaction I.) Under these circumstances the resulting flow rates were from 0.71 to 0.95 ml/ft/da. Reaction II was also tested with the external water heated to a temperature of 65° C., under this condition flow rates of 0.93, 1.25 and 2.48 ml/ft/da were obtained with the resulting fibers.

REACTION III—GAS INTERNAL PHASE AND LIQUID EXTERNAL PHASE

In Reaction III, the interior of the fibers was charged with nitrogen at 35 psig. The exterior of the fibers was in a water bath which was heated in accordance with the following schedule in which time is measured in minutes, gas flow rate in liters/min, nitrogen pressure in psi and bath temperature in degrees Centigrade.

| TIME | GAS FLOW RATE | GAS PRESSURE | BATH TEMP |
|------|---------------|--------------|-----------|
| 0 | 0 | 0 | 68 |
| 1 | 9.0 | 10 | 68 |
| 9 | 0.3 | 10 | 68 |
| 17 | 0.3 | 10 | 78 |
| 18 | 1.0 | 10 | 80 |
| 20 | STOPPED REACTION | | |

The reaction was stopped by removing the fiber from the bath. The measured change in flux density was from 0.30 to 4.047 ml/ft/da.

REACTION IV—GAS INTERNAL PHASE AND GAS EXTERNAL PHASE

In Reaction IV, the interior of the fibers was again charged with nitrogen at 35 psig. The exterior of the fibers was exposed to air heated to 130° C.

Figure 4:
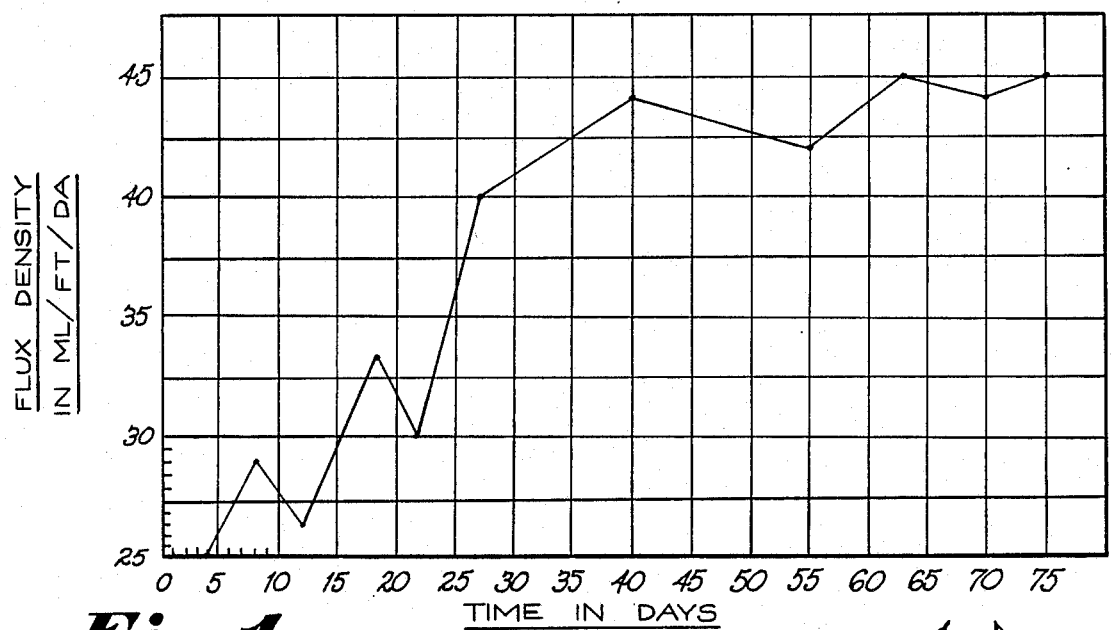
FIG. 4 is a graph showing flux density through the hollow fiber prepared in accordance with the invention as a function of time.

FIG. 4 shows graphically a characteristic of the hollow fibers prepared in accordance with the invention. Flux density is found to increase with time over a period of about sixty days and then level off. This is to be contrasted with FIG. 3 of the Meinecke patent (U.S. Pat. No. 3,873,653) which shows a decrease in flux density which is most pronounced in about the first forty hours. It is theorized that the increase in flux density found with the hollow fibers of the present invention may result from having water pass from the inside of the fiber to the outside; whereas in the Meinecke arrangement water moves from the outside of the fiber to the inside.

MECHANICS OF PORE FORMATION

Observations were made of cellulose acetate in a flat membrane form. With the membrane on a hot surface and treated with a solvent or a plasticizer, and with air above the membrane, it appears that bubbles of gas develop and burst leaving relatively large, funnel shaped cavities on the upper surface, much in the manner of a pancake batter before it is turned over. Examination of the bottom of the membrane reveals a much denser structure. With such an asymmetric permeability membrane, the preferred water flow is from the large pore side to the small pore side.

It will be recognized that while many, and perhaps most, sources of water to be used will be free of particles, there are cases where the water is highly contaminated with dissolved and undissolved solids, e.g. some well and surface water supplies. Where these highly impure waters are used directly in the reservoir which supplies the water to the dispensing tube it is necessary to periodically flush out the salts and solids from the hollow fiber to avoid blocking the water flow through the fiber or the osmotic flow through the walls of the fiber.

Figure 5:
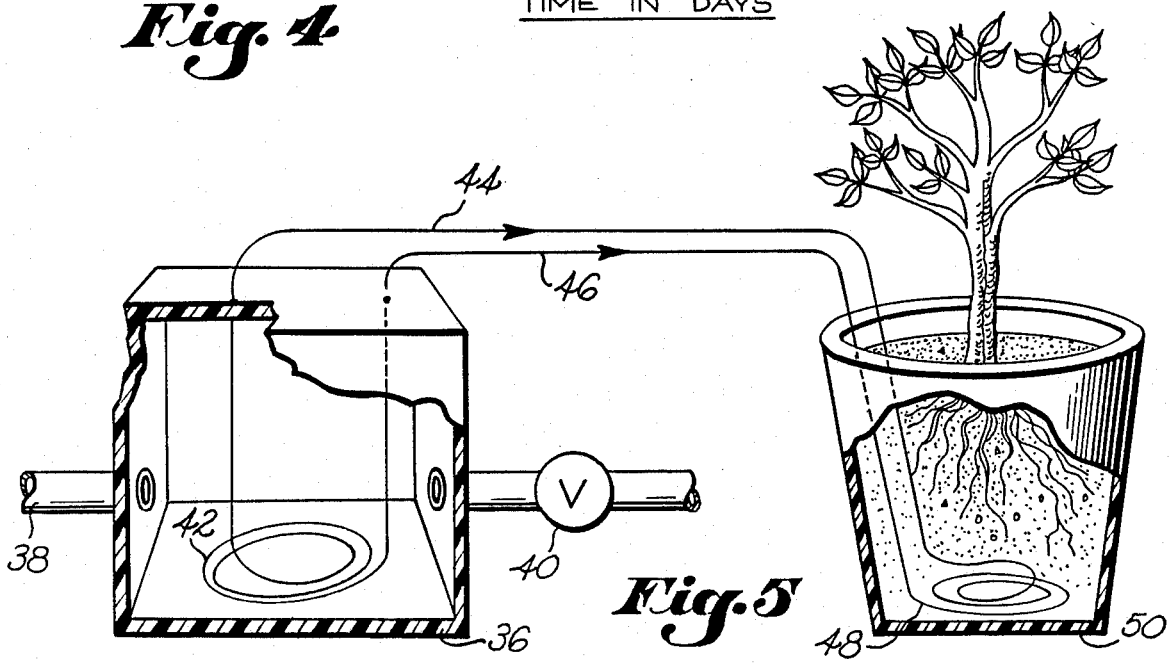
FIG. 5 is a schematic diagram showing a osmotic fiber system which will provide water free of suspended and dissolved solids to a plant.

The necessity for this periodic flushing can be eliminated by treating the impure water by reverse osmosis to remove solid contamination and, if necessary, the use of a biocide to eliminate algae and fungi. Another approach to the treatment of impure water we have discovered is the system which will now be described with reference to FIG. 5. Pressure vessel 36 receives through inlet 38 a supply of impure water under a suitable pressure head. Control of the pressure within pressure vessel 36 may be achieved through the use of pressure regulating valve 40. Contained within pressure vessel 36 is a reverse osmosis hollow fiber coil 42. Coil 42 is made in accordance with one of the reactions taught above. Coil 42 is connected by untreated hollow fibers or tubes 44 and 46 to hollow fiber dispensing coil 48 which is located in pot 50. Coil 48 is prepared and used as previously described herein. Pressure vessel 36 may be located a suitable height above coil 48 to provide a suitable pressure head. If the pressure within pressure vessel 36 is above the osmotic pressure, water will pass through the walls of coil 42 provided the pressure within coil 42 is not too high. The pressure within coil 42 depends, in part, on the dispensing of water from coil 48. This dispensing is regulated by the plant exudate. Consequently, when the plant exudes the bio-surfactant, an increased amount of water will be dispensed from coil 48 and the pressure within coil 48, tubes 44 and 46 and coil 42 will be reduced and reverse osmosis will occur to supply water to coil 42 from pressure vessel 36. Because pressure regulating valve 40 provides a flow of water out of pressure vessel 36, water continuously flows over the exterior of coil 42, thereby flushing away particles and keeping it osmotically regenerated. Although FIG. 5 illustrates a system having a single plant with a single dispensing coil 48, it is contemplated that multiple dispensing coils may be connected to the reverse osmosis coil 42.

There are a number of factors and variables which must be considered in the application of the osmotic fiber systems of this invention. For example, different varieties of plants and different sizes of plants of the same variety have different water uptakes. We have found a divergency of from 25–250 ml/day in water uptake. This spread may not be all inclusive. Some variables which may be controlled in a system such as that of FIG. 5 are: the water pressure of the source, the contamination of the source water, the flux density of the reverse osmosis coil 42, the length of the reverse osmosis coil 42, the temperatures of the water and the ambient, the flux density and length of the dispensing coil(s) 48, the soil conditions in the root zone, and the plant size and type.

With respect to dispensing coil 48, the flux density of this coil without plant exudate is 3.5 ml/ft/da. Plant exudate increases this to 4.5–10.0 ml/ft/da. This data can be used to determine the quantity of water which must be supplied.

Figure 6:
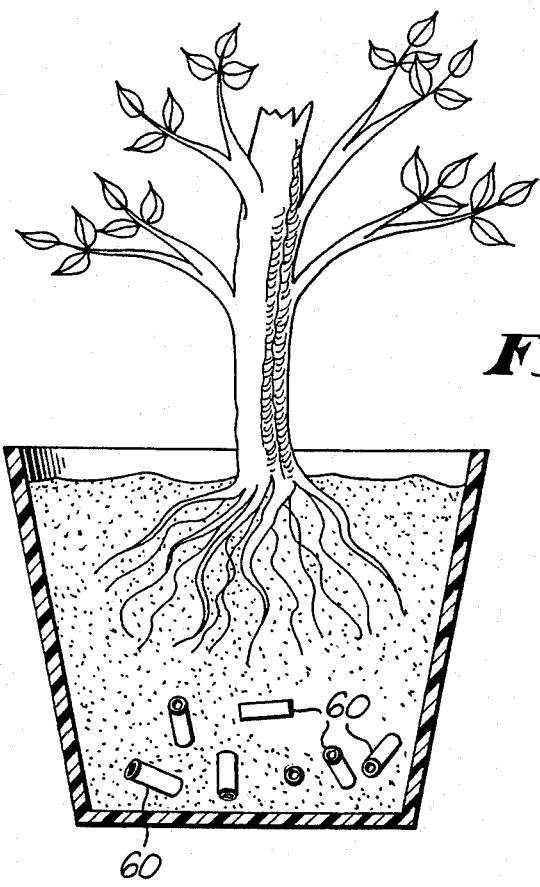
FIG. 6 is an elevation in cross-section of an alternative embodiment of the invention using short fiber lengths in a pot.

The osmotic valve characteristic of the hollow fibers of this invention make the fibers, without a connected reservoir, useful in controlling the water supplied to plant roots. For example, hollow fibers 60 having an internal volume of from 0.01 to 250 ml have been used in potted plants as shown in FIG. 6. These hollow fibers will take up water from the soil both through the open ends by capillary action, and through the permeable fiber walls when excess water is in the root ball zone. This tends to restrict over-watering of the plant. This water within hollow fibers 60 will remain within the fibers, as if in a reservoir, until the hydraulic pressure outside the fiber walls is reduced sufficiently by the moisture content of the soil being reduced. Then water will be released as described with respect to the FIG. 1 embodiment.

Figure 7:
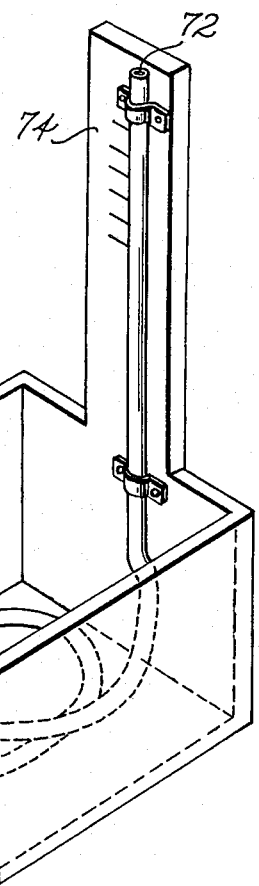
FIG. 7 is an isometric drawing showing apparatus for measuring osmotic pressure.

The osmotic valve nature of the improved permeable hollow fibers of this invention make its use in measuring osmotic pressures particularly useful. Presently available osmotic pressure measurement devices do not measure the component of osmotic pressure which results from dissolved solids which are suspended in solution, but only that which results from those solids which form ions in the solution. FIG. 7 shows container 66 which receives a solution requiring an osmotic pressure measurement. Positioned in container 66 is hollow fiber 68. End 70 of hollow fiber 68 is closed, while end 72 is open. A substantial length of hollow fiber leads to end 72 and is positioned adjacent to graduated scale 74. This may be a separate fiber which is connected to the treated permeable fiber in container 66.

It will be evident that hydrophilic hollow fibers of materials other than cellulose acetate may be treated to enhance their permeability. Such materials include: polyvinyl alcohol, polyvinyl acetate, nylon, polycarbonate polyesters and epoxies. In general, fibers of a material which will hydrolyze (add water) to form a hydrophilic matrix may be used.

It will also be evident that other methods and apparatus using osmosis and reverse osmosis will benefit from the treated hollow fibers of this invention.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

We claim:

1. Demand watering apparatus comprising:
    a dispensing tube for positioning in a pot at a location where plant roots can grow to reach said dispensing tube;
    a substantially rigid foraminous enclosure containing said dispensing tube;
    said dispensing tube formed of as hollow hydrophiillic material and having a tube wall constituting a semipermeable membrane which will pass water at a first rate when there is plant root demand for water, and at a second lower rate when there is no plant root demand;
    said dispensing tube having at least one end available for connecting to a source of water.

2. Demand watering apparatus in accordance with claim 1 further including:
    a root penetrable cage containing said dispensing tube.

3. Demand watering apparatus in accordance with claim 1 further including:
    a conveying tube for conveying water to said dispensing tube.

4. Demand watering apparatus in accordance with claim 3 further including:
    reservoir means for holding a source of water for said conveying tube.

5. An osmotic fiber system comprising:
    a container for containing a media requiring the addition of water;
    a high flux density cellulose acetate hollow fiber positioned in said container;
    a foraminous enclosure rigid enough to contain said fiber having said fiber disposed therein; and
    a water supply connected to said hollow fiber for providing water to said fiber at a pressure above the osmotic pressure of the water in said fiber;

whereby purified water will flow across the walls of said fiber from the high pressure side of said walls to the low pressure side of said walls.

6. An osmotic fiber system comprising:
a container for containing a media from which water must be removed;
a high flux density cellulose acetate hollow fiber for containing water positioned in said container;
a foraminous enclosure to contain said fiber having said fiber disposed therein and sufficiently rigid to prevent crushing of said fiber by said media; and
means for raising the pressure of said media above the osmotic pressure of the water in said fiber.

7. An osmotic fiber system comprising:
a pressure vessel;
a first high flux density cellulose acetate hollow fiber contained in said pressure vessel;
a foraminous enclosure rigid enough to contain said fiber having said fiber disposed therein;
a plant pot;
a second high flux density cellulose acetate hollow fiber contained in said plant pot;
a substantially rigid foraminous enclosure containing said second hollow fiber; and
a flexible tube connecting said first hollow fiber to said second hollow fiber.

8. An osmotic fiber system in accordance with claim 7 wherein:
said first and second hollow fibers are in coils each coil having first and second ends; and
a first flexible tube connects said first ends of said first and second coils and a second flexible tube connects said second ends of said first and second coils.

9. An osmotic fiber system in accordance with claim 7 wherein:
said pressure vessel has a water inlet and a water outlet; and
a pressure regulating valve is connected to said water outlet.

10. Demand watering apparatus for use with a plant in a pot containing soil comprising:
a pot having soil therein;
hollow fiber means positioned in the soil;
a substantially rigid foraminous enclosure containing said hollow fiber means; and
said hollow fiber means having walls permeable to water and impermeable to dissolved and suspended solids.

11. Demand watering apparatus in accordance with claim 10 wherein:
said hollow fiber means has a first hydraulic pressure on one side of said walls and a second hydraulic pressure on the other side of said walls; and
water will pass through said walls in the direction from the higher hydraulic pressure to the lower hydraulic pressure.

12. Apparatus for dispensing water to the roots of a plant when there is a plant root demand comprising:
a coiled dispensing tube having two ends;
a root penetrable cage containing said dispensing tube;
said dispensing tube formed of a hydrophillic material and having a tube wall constituting a semipermeable membrane which will pass water at a first rate when there is a plant root demand for water, and at a second lower rate when there is no plant root demand; and
a delivery tube connected to at least one of said two ends of said dispensing tube.

* * * * *

UNITED STATES PATENT AND TRADEMARK OFFICE
CERTIFICATE OF CORRECTION

PATENT NO. : 4,805,343

DATED : February 21, 1989

INVENTOR(S) : J. Patterson, et al.

It is certified that error appears in the above-identified patent and that said Letters Patent is hereby corrected as shown below:

On the Title Page:

Delete "Robert M. Piecuch, Warsaw, Ind.;" from patent as co-inventor.

Signed and Sealed this

Fourth Day of July, 1989

Attest:

DONALD J. QUIGG

Attesting Officer

Commissioner of Patents and Trademarks